(12) United States Patent
Sasaki et al.

(10) Patent No.: US 12,039,739 B2
(45) Date of Patent: Jul. 16, 2024

(54) MOTION VECTOR DETECTION APPARATUS AND MOTION VECTOR DETECTION METHOD TO ACCURATELY DETECT A MOTION VECTOR FROM A CAPTURED IMAGE UTILIZING A DEGREE OF RELIABILITY INFORMATION

(71) Applicant: SONY GROUP CORPORATION, Tokyo (JP)

(72) Inventors: Toshiyuki Sasaki, Tokyo (JP); Kazunori Kamio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 431 days.

(21) Appl. No.: 17/292,801

(22) PCT Filed: Aug. 16, 2019

(86) PCT No.: PCT/JP2019/032158
§ 371 (c)(1),
(2) Date: May 11, 2021

(87) PCT Pub. No.: WO2020/105235
PCT Pub. Date: May 28, 2020

(65) Prior Publication Data
US 2021/0398291 A1     Dec. 23, 2021

(30) Foreign Application Priority Data
Nov. 19, 2018    (JP) ................................ 2018-216339

(51) Int. Cl.
*G06T 7/00*      (2017.01)
*G06T 5/73*      (2024.01)
(Continued)

(52) U.S. Cl.
CPC .................. *G06T 7/20* (2013.01); *G06T 5/73* (2024.01); *G06T 7/73* (2017.01); *H04N 5/144* (2013.01); *G06T 2207/10028* (2013.01)

(58) Field of Classification Search
CPC .. G06T 7/20; G06T 7/73; G06T 5/003; G06T 2207/10028; H04N 5/144
See application file for complete search history.

(56) References Cited

U.S. PATENT DOCUMENTS

| 6,118,475 A | 9/2000 | Iijima et al. |
| 2012/0013796 A1* | 1/2012 | Sato ...................... H04N 7/014 |
| | | 348/E7.003 |

(Continued)

FOREIGN PATENT DOCUMENTS

| JP | 7-325924 A | 12/1995 |
| JP | 2007-272733 A | 10/2007 |
| JP | 2010-016580 A | 1/2010 |

OTHER PUBLICATIONS

International Search Report and Written Opinion of PCT Application No. PCT/JP2019/032158, dated Sep. 24, 2019, 07 pages of ISRWO.

*Primary Examiner* — Pakee Fang
(74) *Attorney, Agent, or Firm* — CHIP LAW GROUP

(57) ABSTRACT

Provided is a first motion vector detection unit that detects a motion vector on a basis of self-motion data and depth image data. A second motion vector detection unit that detects a motion vector on a basis of captured image data. A motion vector merging unit that merges the motion vector detected by the first motion vector detection unit with the motion vector detected by the second motion vector detection unit.

3 Claims, 12 Drawing Sheets

(51) Int. Cl.
    *G06T 7/20*     (2017.01)
    *G06T 7/73*     (2017.01)
    *H04N 5/14*     (2006.01)

(56) References Cited

U.S. PATENT DOCUMENTS

| | | | |
|---|---|---|---|
| 2013/0342536 A1* | 12/2013 | Taya | G06F 3/012 345/427 |
| 2014/0321547 A1* | 10/2014 | Takehara | H04N 19/159 375/240.16 |
| 2015/0243038 A1* | 8/2015 | Zhao | G06V 40/25 382/103 |

* cited by examiner

MOTION VECTOR DETECTION APPARATUS AND MOTION VECTOR DETECTION METHOD TO ACCURATELY DETECT A MOTION VECTOR FROM A CAPTURED IMAGE UTILIZING A DEGREE OF RELIABILITY INFORMATION

CROSS REFERENCE TO RELATED APPLICATIONS

This application is a U.S. National Phase of International Patent Application No. PCT/JP2019/032158 filed on Aug. 16, 2019, which claims priority benefit of Japanese Patent Application No. JP 2018-216339 filed in the Japan Patent Office on Nov. 19, 2018. Each of the above-referenced applications is hereby incorporated herein by reference in its entirety.

TECHNICAL FIELD

This technology relates to a motion vector detection apparatus, a motion vector detection method, a program, and an image processing apparatus that enable accurate detection of a motion vector.

BACKGROUND ART

In recent years, an image processing apparatus detects a motion vector from an image to perform, for example, noise removal using an image selected from adjacent frames in a time direction on the basis of the motion vector. Furthermore, in order to accurately detect a motion vector, as disclosed in, for example, Patent Document 1, motion vector detection accuracy is improved by merging a motion vector predicted in a current frame with a previously predicted motion vector, using a feature value.

CITATION LIST

Patent Document

Patent Document 1: Japanese Patent Application Laid-Open No. 2007-272733

SUMMARY OF THE INVENTION

Problems to be Solved by the Invention

Meanwhile, in a case where there is a large change in brightness among frames or in a case where there is a flat portion or a dark portion in an image, it is difficult to estimate a motion vector from an image. It is therefore difficult to detect a correct motion vector, even using a previously predicted motion vector.

Hence, an object of this technology is to provide a motion vector detection apparatus, a motion vector detection method, a program, and an image processing apparatus each capable of accurately detecting a motion vector.

Solutions to Problems

A first aspect of this technology is directed to a motion vector detection apparatus including:
 a first motion vector detection unit configured to detect a motion vector on the basis of self-motion data of a sensor unit and depth image data generated by the sensor unit;
 a second motion vector detection unit configured to detect a motion vector on the basis of captured image data generated by the sensor unit; and
 a motion vector merging unit configured to merge the motion vector detected by the first motion vector detection unit with the motion vector detected by the second motion vector detection unit.

In this technology, the first motion vector detection unit detects a motion vector on the basis of self-motion data of the sensor unit and depth image data generated by the sensor unit. For example, the first motion vector detection unit calculates a candidate motion vector using a projection matrix calculated in advance on the basis of an angle of view and an aspect ratio upon generation of the depth image data and captured image data, and merges the candidate motion vector with a previously detected motion vector to detect the motion vector. The motion vector is merged on the basis of a predicted error when using the candidate motion vector and a predicted error when using the previously detected motion vector. The first motion vector detection unit calculates the candidate motion vector using the depth image data and a coordinate transformation matrix representing a motion indicated by the self-motion data. Alternatively, an estimation unit may be provided, which is configured to generate an environment map and estimate a self position on the basis of the self-motion data, and the first motion vector detection unit may detect the candidate motion vector using the environment map generated by the estimation unit and an estimation result of the self position.

The first motion vector detection unit and the second motion vector detection unit each calculate a predicted error when using the detected motion vector. The motion vector merging unit calculates a degree of reliability of the motion vector detected by the first motion vector detection unit, using the predicted error calculated by the first motion vector detection unit. The motion vector merging unit calculates a degree of reliability of the motion vector detected by the second motion vector detection unit, using the predicted error calculated by the second motion vector detection unit. The motion vector merging unit merges the motion vector detected by the first motion vector detection unit with the motion vector detected by the second motion vector detection unit, on the basis of the calculated degrees of reliability. Furthermore, the motion vector merging unit calculates a degree of reliability of the motion vector detected by the first motion vector detection unit, on the basis of the predicted error calculated by the first motion vector detection unit and an error of the depth image data. The motion vector merging unit calculates a degree of reliability of the motion vector detected by the second motion vector detection unit, on the basis of the predicted error calculated by the second motion vector detection unit and a noise amount of the captured image data.

Moreover, a depth processing unit may be provided, which is configured to perform definition enhancement processing on the depth image data generated by the sensor unit and to generate high-definition depth image data. The depth processing unit may perform definition enhancement processing using high-quality captured image data obtained by performing image quality enhancement processing on the captured image data using the motion vector merged by the motion vector merging unit. The first motion vector detection unit may use the high-definition depth image data generated by the depth processing unit, in place of the depth image data.

A second aspect of this technology is directed to a motion vector detection method including:

causing a first motion vector detection unit to detect a motion vector on the basis of self-motion data of a sensor unit and depth image data generated by the sensor unit;

causing a second motion vector detection unit to detect a motion vector on the basis of captured image data generated by the sensor unit; and causing a motion vector merging unit to merge the motion vector detected by the first motion vector detection unit with the motion vector detected by the second motion vector detection unit.

A third aspect of this technology is directed to a program causing a computer to detect a motion vector using self-motion data of a sensor unit, depth image data generated by the sensor unit, and captured image data, the program causing the computer to execute:
a procedure of detecting a motion vector on the basis of the self-motion data and the depth image data;
a procedure of detecting a motion vector on the basis of the captured image data; and
a procedure of merging the motion vector detected on the basis of the self-motion data and the depth image data with the motion vector detected on the basis of the captured image data.

Note that the program according to the present technology is, for example, a program that can be provided by a storage medium, a communication medium, for example, a storage medium such as an optical disk, a magnetic disk, or a semiconductor memory, or a communication medium such as a network that provides a program to a general computer capable of executing various programs and codes, in a computer-readable format. When such a program is provided in the computer-readable format, processing according to the program is implemented on the computer.

A fourth aspect of this technology is directed to an image processing apparatus including:
a first motion vector detection unit configured to detect a motion vector on the basis of self-motion data of a sensor unit and depth image data generated by the sensor unit;
a second motion vector detection unit configured to detect a motion vector on the basis of captured image data generated by the sensor unit;
a motion vector merging unit configured to merge the motion vector detected by the first motion vector detection unit with the motion vector detected by the second motion vector detection unit; and
an image quality enhancement processing unit configured to perform image quality enhancement processing on the captured image data using the motion vector merged by the motion vector merging unit to generate high-quality captured image data.

MODE FOR CARRYING OUT THE INVENTION

Hereinafter, a description will be given of modes for carrying out the present technology. Note that the description is given in the following order.

1. First Embodiment
   1-1. Configuration of image processing apparatus
   1-2. Configurations and operations of respective units
2. Second Embodiment
   2-1. Configuration of image processing apparatus
   2-2. Configurations and operations of respective units
3. Other embodiments
4. Application examples 1. First Embodiment <1-1. Configuration of Image Processing Apparatus>

Figure 1:
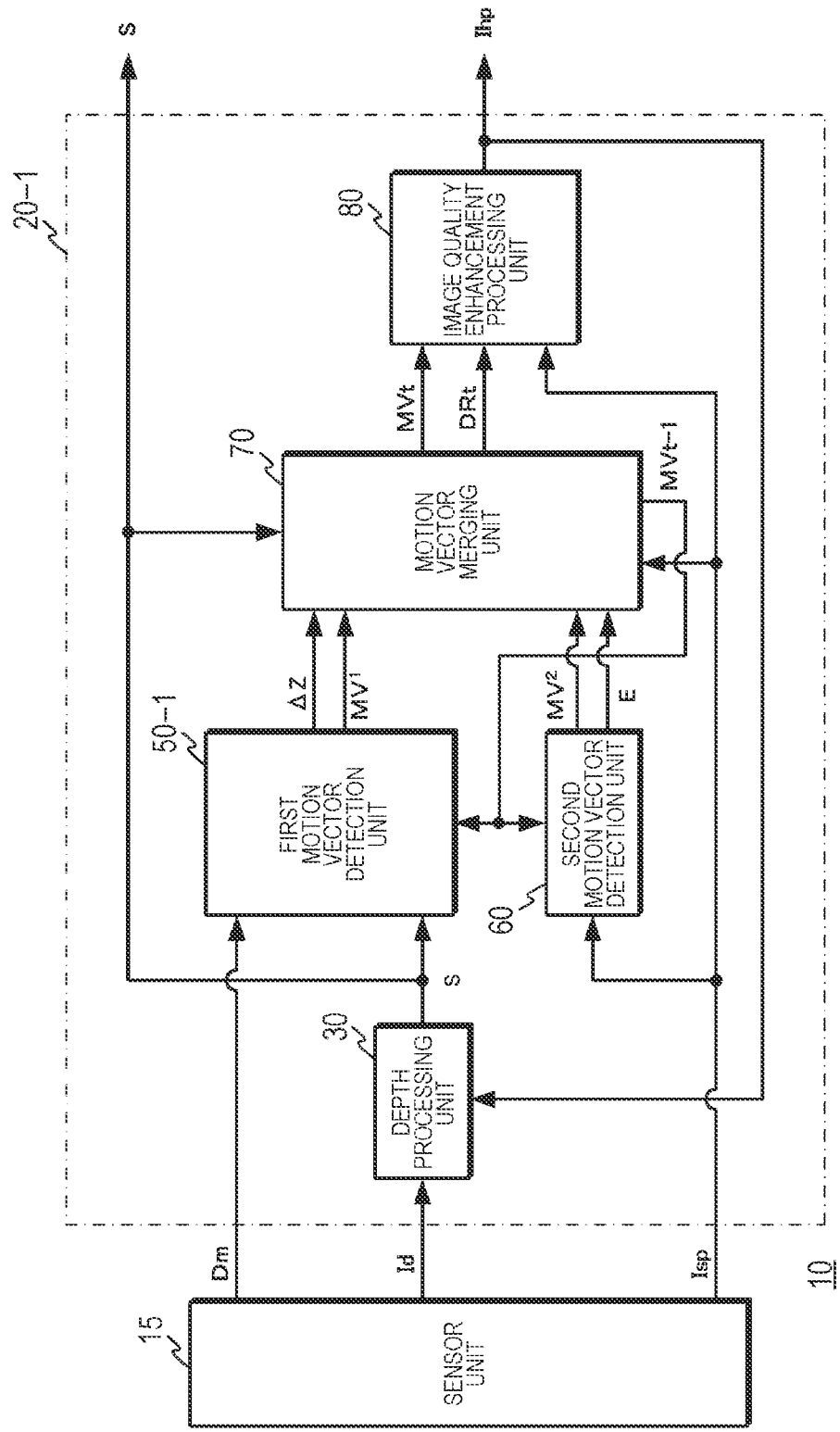
FIG. 1 is a diagram that exemplifies a configuration of an information processing system.

FIG. 1 exemplifies a configuration of an information processing system. An information processing system 10 includes a sensor unit 15 and an image processing unit 20-1.

The sensor unit 15 includes an image sensor, a depth sensor, and a motion sensor such as an inertial measurement unit (IMU), and generates multiple kinds of sensing data. Specifically, the image sensor generates captured image data Isp. The depth sensor generates depth image data Id indicating a distance to a subject contained in a captured image. In addition, the motion sensor generates self-motion data Dm indicating a motion of the sensor unit 15.

The image processing unit 20-1 is configured using a motion vector detection apparatus according to the present technology. The image processing unit 20-1 includes a depth processing unit 30, a first motion vector detection unit 50-1, a second motion vector detection unit 60, a motion vector merging unit 70, and an image quality enhancement processing unit 80.

The depth processing unit 30 performs definition enhancement processing on the depth image data Id supplied from the depth sensor of the sensor unit 15, to generate depth image data S that is higher in definition than the depth image data Id. The depth processing unit 30 performs the definition enhancement processing using high-quality image data Ihp obtained by performing image quality enhancement processing on the captured image data Isp using a motion vector merged by the motion vector merging unit 70. The depth processing unit 30 outputs, to the first motion vector detection unit 50-1, the depth image data S obtained by performing the definition enhancement processing.

The first motion vector detection unit 50-1 receives the self-motion data Dm from the sensor unit 15, receives the depth image data S from the depth processing unit 30, and receives a previous motion vector, for example, a motion vector MVt−1 in a preceding frame from the motion vector merging unit 70. The first motion vector detection unit 50-1 detects a motion vector $MV^1$ on the basis of the self-motion data Dm, the depth image data S and previous depth image data S' (e.g., depth image data S' in the preceding frame), and the motion vector MVt−1, and calculates a predicted error Δz when using the motion vector $MV^1$. The first motion vector detection unit 50-1 outputs the detected motion vector $MV^1$ and the calculated predicted error Δz to the motion vector merging unit 70.

The second motion vector detection unit 60 receives the captured image data Isp from the sensor unit 15, and receives the previous motion vector, for example, the motion vector MVt−1 in the preceding frame from the motion vector merging unit 70. The second motion vector detection unit 50-1 detects a motion vector $MV^2$ on the basis of the captured image data Isp and the motion vector MVt−1, and calculates a predicted error E when using the motion vector $MV^2$. The first motion vector detection unit 50-2 outputs the detected motion vector $MV^2$ and the calculated predicted error E to the motion vector merging unit 70.

The motion vector merging unit 70 merges the motion vector detected by the first motion vector detection unit 50-1 with the motion vector detected by the second motion vector detection unit 60. The motion vector merging unit 70 receives the captured image data Isp from the image sensor, receives the depth image data S from the depth processing unit 30, receives the motion vector $MV^1$ and the predicted error Δz from the first motion vector detection unit 50-1, and receives the motion vector $MV^2$ and the predicted error E from the second motion vector detection unit 50-1. The motion vector merging unit 70 calculates a degree of reliability DRα on the basis of the depth image data S and the predicted error Δz, and calculates a degree of reliability DRβ on the basis of the captured image data Isp and the predicted error E. The motion vector merging unit 70 merges the motion vector $MV^1$ with the motion vector $MV^2$ on the basis of the degrees of reliability DRα and DRβ to generate a motion vector MVt. Furthermore, the motion vector merging unit 70 calculates a degree of reliability DRt of the motion vector MVt, and outputs the motion vector MVt and the degree of reliability DRt to the image quality enhancement processing unit 80.

The image quality enhancement processing unit 80 receives the captured image data Isp from the image sensor, and receives the motion vector MVt and the degree of reliability DRt from the motion vector merging unit 70. The image quality enhancement processing unit 80 generates high-quality image data Ihp that is higher in image quality than the captured image data Isp, on the basis of the motion vector MVt, the degree of reliability DRt, and the captured image data Isp. Note that the image quality enhancement processing unit 80 outputs the generated high-quality image data Ihp to the outside and, in addition, supplies the generated high-quality image data Ihp to the depth processing unit 30 as described above.

<1-2. Configurations and Operations of Respective Units>

Figure 2:
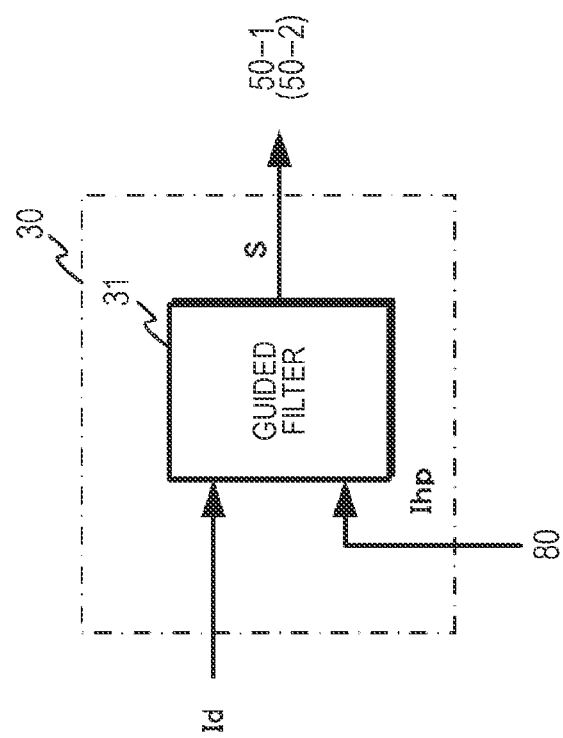
FIG. 2 is a diagram that exemplifies a configuration of a depth processing unit.

Next, a description will be given of configurations and operations of the respective units. FIG. 2 exemplifies a configuration of the depth processing unit. In the depth processing unit 30, a guided filter 31 performs, as the definition enhancement processing, guided filter processing assuming that, for example, a linear conversion model is established for a guide image and an output image. Formula (1) represents the linear conversion model, the guide image J is the high-quality image data Ihp, and "ωk" represents a peripheral region of a pixel k. The high-definition depth image data S is generated using the high-quality image data Ihp and coefficients ak and bk.

[Mathematical Formula 1]

$$S_i = a_k J_i + b_k, \forall i \in \omega_k \quad (1)$$

Here, since the output image is unknown, a relationship between the unknown depth image data S and the guide image J cannot be estimated. Therefore, the depth processing unit 30 calculates the coefficients ak and bk that minimize an error function FE (ak, bk) represented by Formula (2). The error function FE (ak, bk) is a function indicating a difference between the depth image data Id and the depth image data S. Note that Formula (3) represents a calculation formula for the coefficient ak, and Formula (4) represents a calculation formula for the coefficient bk. In Formulas (2) and (3), "∈r" represents a coefficient for regularization.

[Mathematical Formula 2]

$$FE(a_k, b_k) = \sum_{i \in \omega_k} (a_k J_i + b_k - I_i)^2 + \epsilon_r a_k^2 \quad (2)$$

$$a_k = \frac{\frac{1}{|\omega|}\sum_{i \in \omega_k} J_i I_i - \bar{J}_k \bar{I}_k}{\mathrm{Var}[I_i] + \epsilon_r} \quad (3)$$

$$b_k = \bar{I}_k - a_k \bar{J}_k \quad (4)$$

The depth processing unit 30 performs arithmetic processing of Formula (5), using the calculated coefficients ak and bk and the high-quality image data Ihp as the guide image J, to generate pixel data (a depth value) Si of a pixel i in the depth image data S. Note that Formula (6) represents a calculation formula for an average value of the coefficient ak in the peripheral region ωi, and Formula (7) represents a calculation formula for an average value of the coefficient bk in the peripheral region ωi.

[Mathematical Formula 3]

$$S_i = \bar{a}_i J_i + \bar{b}_i \quad (5)$$

$$\bar{a}_i = \frac{1}{\omega} \sum_{k \in \omega_i} a_i \quad (6)$$

$$\bar{b}_i = \frac{1}{\omega} \sum_{k \in \omega_i} b_i \quad (7)$$

As described above, the depth processing unit 30 generates the depth image data S that is higher in definition than the depth image data Id, on the basis of the depth image data Id from the sensor unit 15 and the high-quality image data Ihp from the image quality enhancement processing unit 80.

Figure 3:
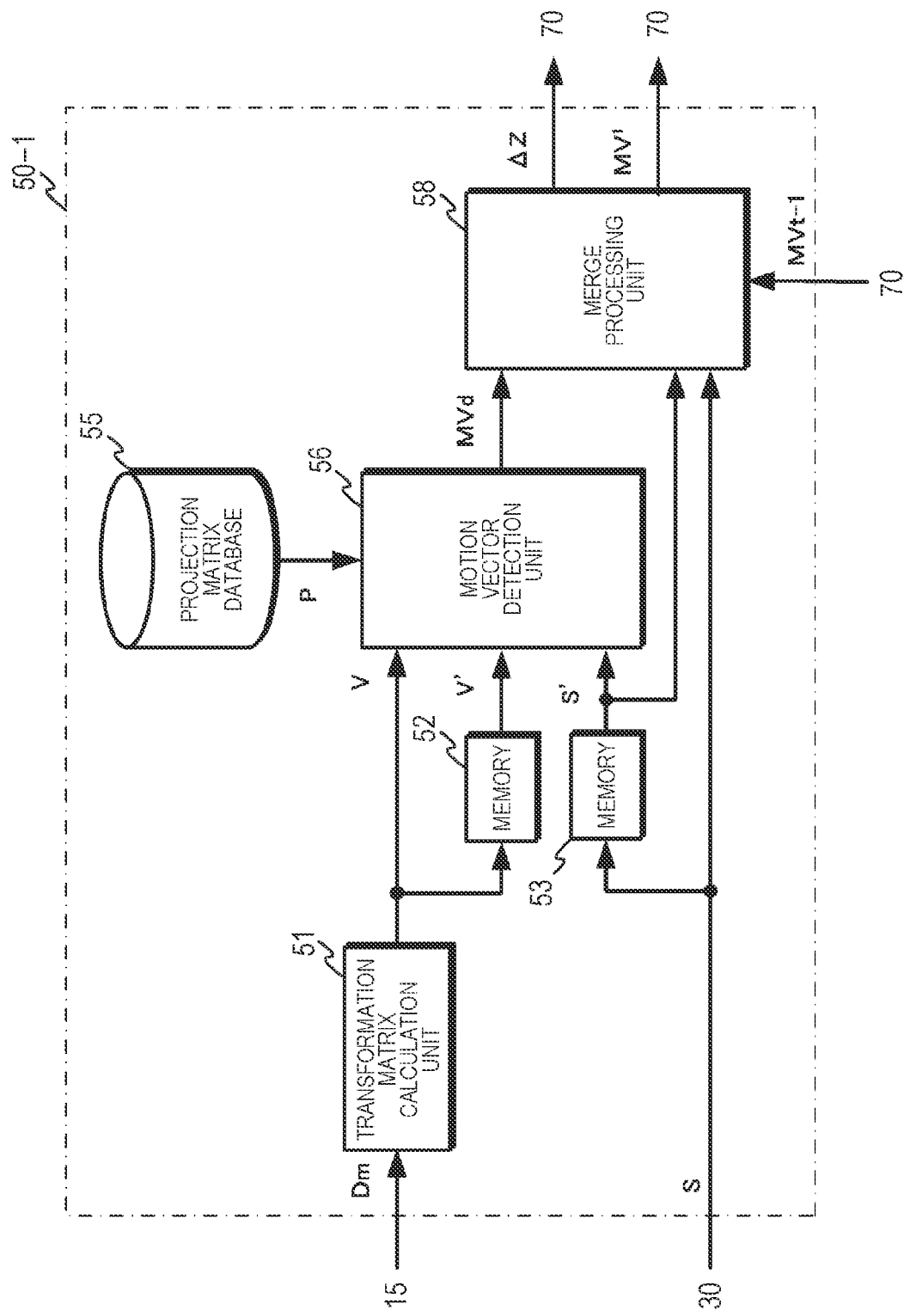
FIG. 3 is a diagram that exemplifies a configuration of a first motion vector detection unit.

FIG. 3 exemplifies a configuration of the first motion vector detection unit. The first motion vector detection unit 50-1 includes a transformation matrix calculation unit 51, memories 52 and 53, a projection matrix database 55, a motion vector detection unit 56, and a merge processing unit 58.

The transformation matrix calculation unit 51 calculates a sensor coordinate transformation matrix (hereinafter, referred to as a "coordinate transformation matrix") from the self-motion data Dm. The self-motion data Dm indicates a translation amount T and a rotation parameter R of the sensor unit 15. The transformation matrix calculation unit 51 calculates a coordinate transformation matrix V on the basis of Formula (8), and outputs the coordinate transformation matrix V to the memory 52 and the motion vector detection unit 56.

[Mathematical Formula 4]

$$V = RT = \begin{pmatrix} r_{00} & r_{01} & r_{02} & t_x \\ r_{10} & r_{11} & r_{12} & t_y \\ r_{20} & r_{21} & r_{22} & t_z \\ 0 & 0 & 0 & 1 \end{pmatrix} \quad (8)$$

The memory 52 stores the coordinate transformation matrix V calculated by the transformation matrix calculation unit 51. Furthermore, the memory 52 outputs the stored coordinate transformation matrix V to the motion vector detection unit 56. The memory 53 stores the depth image data S supplied from the depth processing unit 30. Furthermore, the memory 53 outputs the stored depth image data S to the motion vector detection unit 56.

Figure 4B:
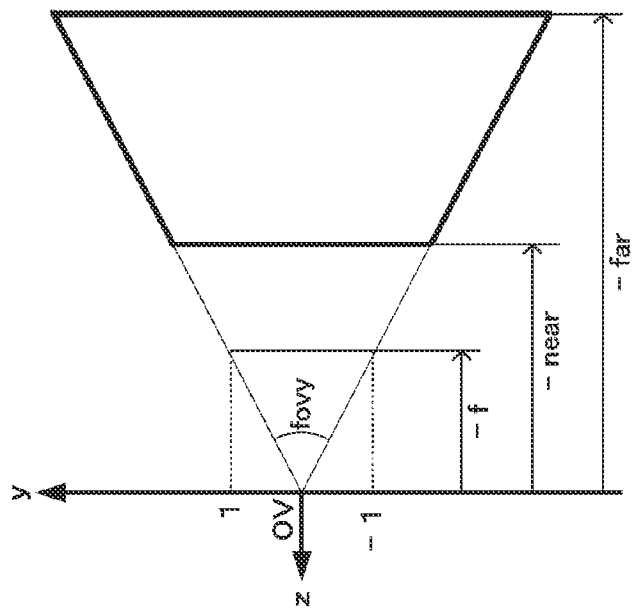
FIGS. 4A and 4B are diagrams for explaining a projection matrix.
Figure 4A:
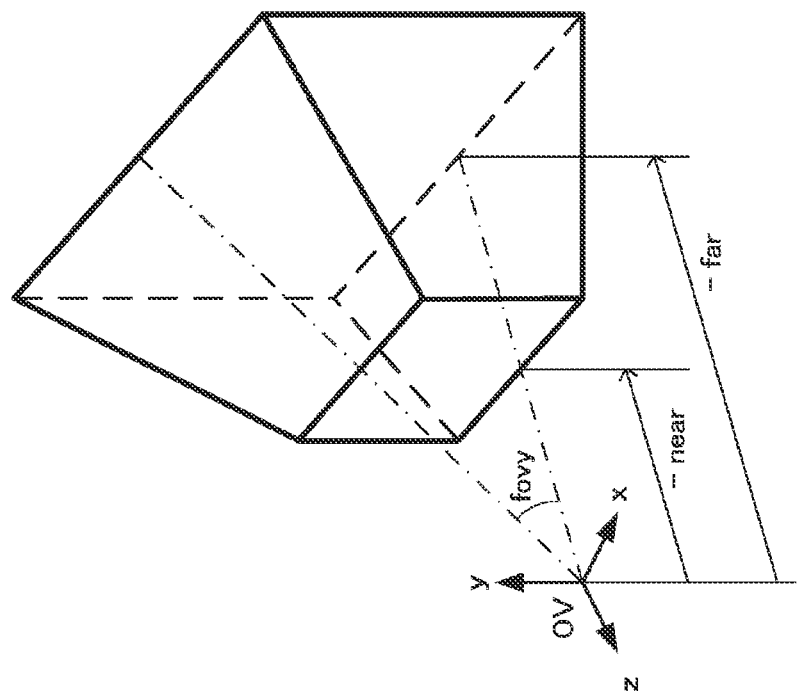

The projection matrix database 55 stores a projection matrix P. FIGS. 4A and 4B are diagrams for explaining a projection matrix. A quadrangular pyramid defined by a front face with a depthwise distance "-near" to a point of view OV and a rear face with a depthwise distance "-far" to the point of view OV is called a frustum. Furthermore, it is known that a projection matrix (a perspective projection matrix) P for screen coordinate transformation can be calculated on the basis of Formula (9) in which "f" represents a distance to a projection plane having a y-directional angle of view fovy in the frustum, a screen aspect ratio aspect, and an upper end of "1" and a lower end of "−1". Note that the distance "f" can be represented as a function of the angle of view fovy as represented by Formula (10).

[Mathematical Formula 5]

$$P = \begin{pmatrix} \dfrac{f}{aspect} & 0 & 0 & 0 \\ 0 & f & 0 & 0 \\ 0 & 0 & \dfrac{far+near}{far-near} & \dfrac{2 \cdot far \cdot near}{far-near} \\ 0 & 0 & -1 & 0 \end{pmatrix} \quad (9)$$

$$f = \dfrac{1}{\tan\left(\dfrac{fovy}{2}\right)} = \cot\left(\dfrac{fovy}{2}\right) \quad (10)$$

The projection matrix database 55 stores in advance the projection matrix P calculated on the basis of the angle of view and aspect ratio of the depth sensor in the sensor unit 15 and the distance to the projection plane. The projection matrix P stored in the projection matrix database 55 is output to the motion vector detection unit 56.

The motion vector detection unit 56 calculates a candidate motion vector using the depth image data, the projection matrix, and the coordinate transformation matrix.

Figure 5:
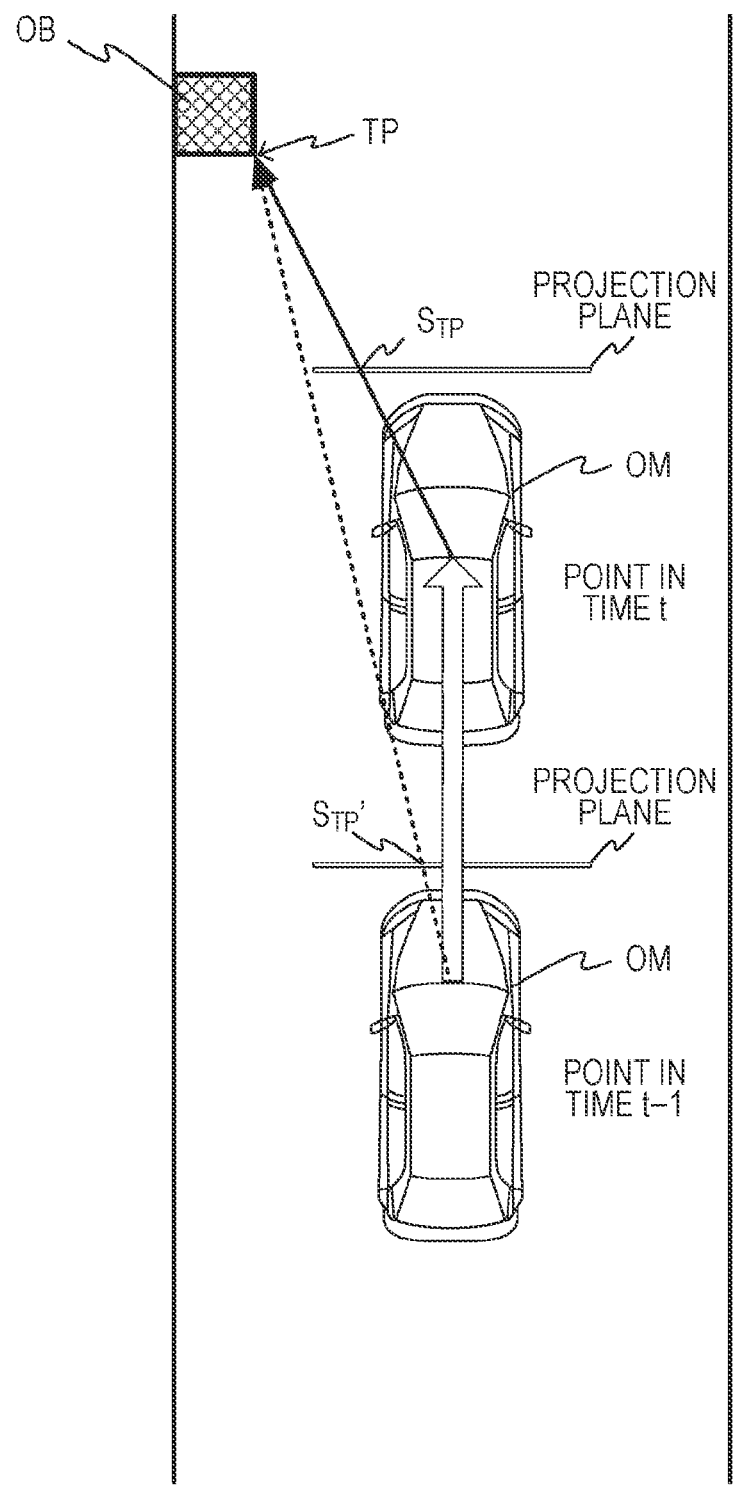
FIG. 5 is a diagram for explaining an operation of a motion vector detection unit.

FIG. 5 is a diagram for explaining an operation of the motion vector detection unit. For example, the sensor unit 15 provided in a moving object OM acquires depth image data at a point in time t and depth image data at a previous point in time (e.g., a point in time one frame before) t−1. The depth image data contains an object OB. Note that Formula (11) represents world coordinates W of a position TP in the object OB. Here, Formula (12) represents pixel information (screen coordinates) STP of the position TP in the depth image data acquired at the point in time t, and Formula (13) represents pixel information (screen coordinates) STP' of the position TP in the depth image data acquired at the point in time t−1. The world coordinates W of the position TP can be transformed into the pixel information STP by performing arithmetic processing of Formula (14) using the projection matrix P and the coordinate transformation matrix V. Furthermore, the world coordinates W can be transformed into the pixel information STP' by performing arithmetic processing of Formula (15) using the projection matrix P and a coordinate transformation matrix V'. Furthermore, a candidate motion vector MVdt from the point in time t−1 to the point in time t can be calculated from Formula (16). Note that since Formula (14) is transformed into Formula (17), Formula (16) can also be represented as Formula (18). Therefore, the motion vector detection unit 56 calculates the candidate motion vector MVdt on the basis of Formula (18), and outputs the candidate motion vector MVdt to the merge processing unit 58.

[Mathematical Formula 6]

$$W=(xyz)^T \quad (11)$$

$$S_{TP}=(x_{TP}y_{TP}z_{TP}) \quad (12)$$

$$S'_{TP}=(x'_{TP}y'_{TP}z'_{TP}) \quad (13)$$

$$S_{TP}=PVW \quad (14)$$

$$S'_{TP}=PV'W \quad (15)$$

$$MV_{dt}=S_{TP}-S'_{TP}=S_{TP}-PV'W \quad (16)$$

$$W=V^{-1}P^{-1}S_{TP} \quad (17)$$

$$MV_{dt}=S_{TP}PV'V^{-1}P^{-1} \quad (18)$$

The merge processing unit 58 merges the candidate motion vector MVdt calculated by the motion vector detection unit 56 with the motion vector MVt−1 supplied from the motion vector merging unit 70, to generate a first motion vector $MV^1$. The merge processing unit 58 selects one of the candidate motion vector MVdt and the motion vector MVt−1 or merges the candidate motion vector MVdt with the motion vector MVt−1 to generate the first motion vector $MV^1$ on the basis of a predicted error Δzt when using the candidate motion vector MVdt and a predicted error Δzt−1 when using the motion vector MVt−1.

The merge processing unit 58 predicts pixel information at the point in time t from the candidate motion vector MVdt and pixel information at the point in time t−1, and sets the predicted error Δzt for a difference between the predicted pixel information and the pixel information at the point in time t. Furthermore, the merge processing unit 58 predicts the pixel information at the point in time t from the motion vector MVt−1 and the pixel information at the point in time t−1, and sets the predicted error Δzt−1 for a difference between the predicted pixel information and the pixel information at the point in time t.

In a case where the merge processing unit 58 selects one of the candidate motion vector MVdt and the motion vector MVt−1 to generate the first motion vector $MV^1$, when the predicted error Δzt is smaller than the predicted error Δzt−1, the merge processing unit 58 sets the candidate motion vector MVdt for the first motion vector $MV^1$, and sets the predicted error Δzt for the predicted error Δz of the first motion vector $MV^1$. Furthermore, when the predicted error $\Delta$zt is not smaller than the predicted error $\Delta$zt−1, the merge processing unit 58 sets the motion vector MVt−1 for the first motion vector $MV^1$, and sets the predicted error $\Delta$zt−1 for the predicted error $\Delta$z when using the first motion vector $MV^1$.

In a case where the merge processing unit 58 merges the candidate motion vector MVdt with the motion vector MVt−1 to generate the first motion vector $MV^1$, the merge processing unit 58 calculates mixing ratios $\alpha$t and $\alpha$t−1 on the basis of Formulas (19) and (20). Using the calculated mixing ratios $\alpha$t and $\alpha$t−1, the merge processing unit 58 merges the candidate motion vector MVdt with the motion vector MVt−1 as represented by Formula (21) to generate the first motion vector $MV^1$. Furthermore, the merge processing unit 58 calculates the predicted error $\Delta$z when using the first motion vector $MV^1$, on the basis of Formula (22). Note that $\rho$t in Formula (19) and $\rho$t−1 in Formula (20) represent adjustment parameters set in advance.

[Mathematical Formula 7]

$$\alpha_t = \exp\left(-\frac{\Delta Z_t^2}{2\rho_t^2}\right) \quad (19)$$

$$\alpha_{t-1} = \exp\left(-\frac{\Delta Z_{t-1}^2}{2\rho_{t-1}^2}\right) \quad (20)$$

$$MV^1 = \frac{\alpha_t \cdot MV_t^1 + \alpha_{t-1} \cdot MV_{t-1}}{\alpha_t + \alpha_{t-1}} \quad (21)$$

$$\Delta z = \alpha_t \Delta z_t + \alpha_{t-1} \Delta z_{t-1} \quad (22)$$

The merge processing unit 58 sets the first motion vector $MV^1$ for the motion vector detected by the first motion vector detection unit 50-1, and outputs the first motion vector $MV^1$ together with the predicted error $\Delta$z to the motion vector merging unit 70.

Figure 6:
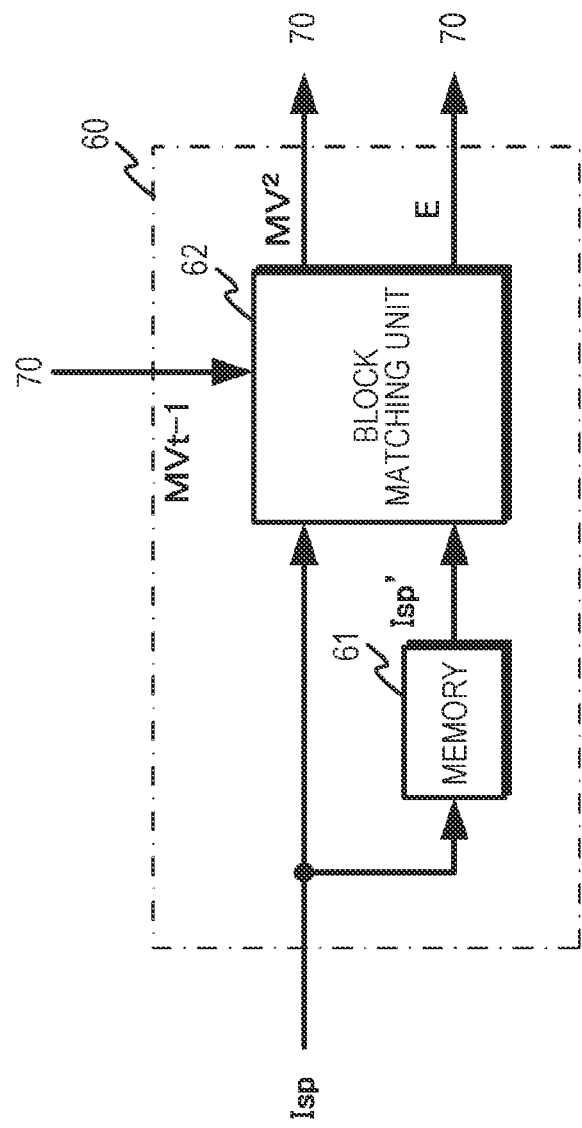
FIG. 6 is a diagram that exemplifies a configuration of a second motion vector detection unit.

FIG. 6 exemplifies a configuration of the second motion vector detection unit. The second motion vector detection unit 60 includes a memory 61 and a block matching unit 62.

The memory 61 stores the captured image data Isp. Furthermore, the block matching unit 62 performs block matching using the captured image data Isp and a previous captured image stored in the memory 61, for example, captured image data Isp' one frame before to calculate a second motion vector $MV^2$ and the predicted error E. For example, a sum of absolute difference (SAD) represented by Formula (23) is used as the predicted error E. Note that in Formula (23), pixel data QCi is "i"th pixel data in a current block (Block A) as represented by Formula (24), and pixel data QRi is "i"th pixel data in a reference block (Block B) as represented by Formula (25). Note that a sum of squared difference (SSD) or the like may be used as the predicted error E, in addition to the SAD.

[Mathematical Formula 8]

$$E = \Sigma_{Block\ A}|QC_i - QR_i| \quad (23)$$

$$QC_i \in Block\ A \quad (24)$$

$$QR_i \in Block\ B \quad (25)$$

Furthermore, the second motion vector detection unit 60 may detect a motion vector from a captured image using a gradient method or the like, in addition to the block matching method. The second motion vector detection unit 60 outputs the second motion vector $MV^2$ and the predicted error E to the motion vector merging unit 70.

Figure 7:
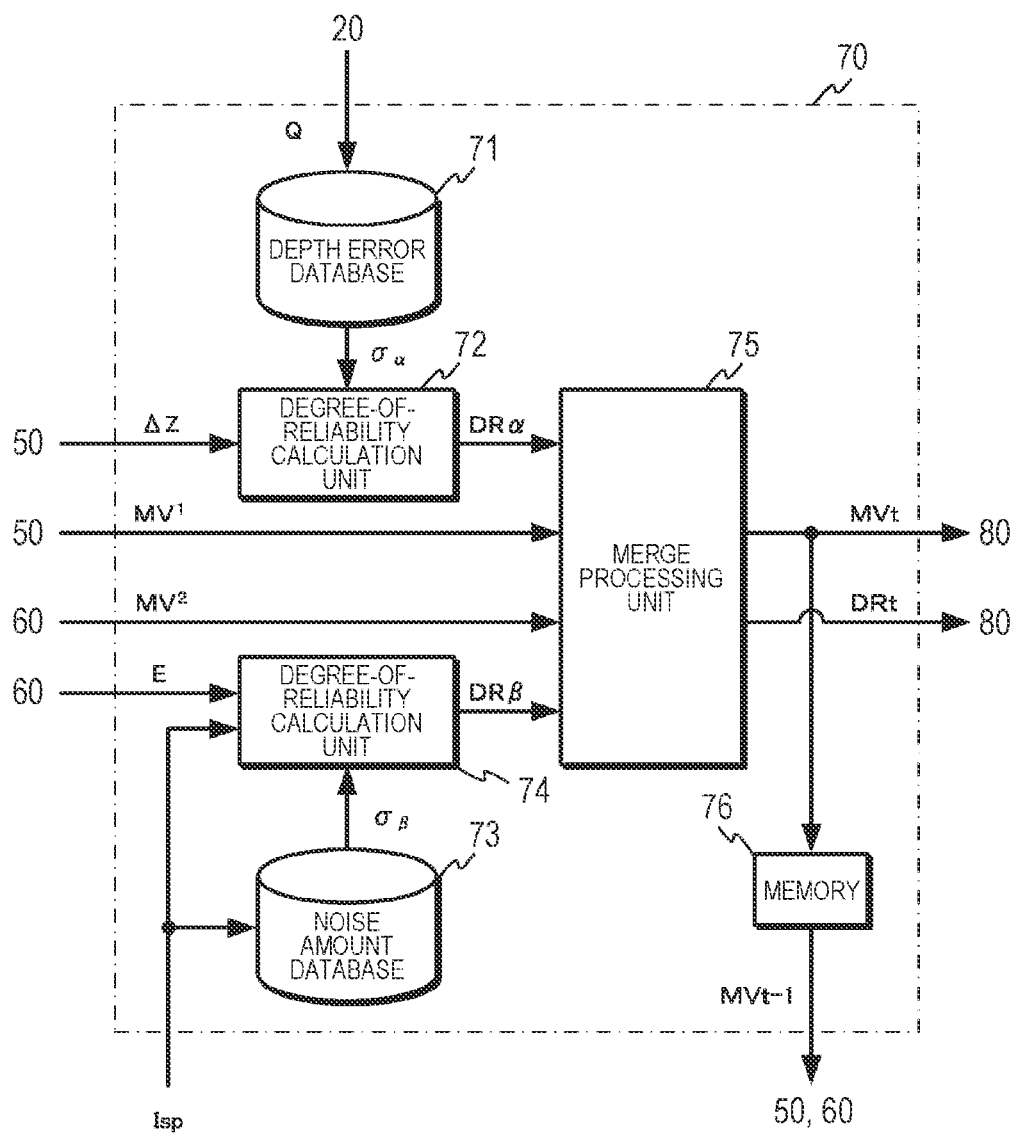
FIG. 7 is a diagram that exemplifies a configuration of a motion vector merging unit.

FIG. 7 exemplifies a configuration of the motion vector merging unit. The motion vector merging unit 70 includes a depth error database 71, degree-of-reliability calculation units 72 and 74, a noise amount database 73, a merge processing unit 75, and a memory 76.

The depth error database 71 stores in advance an error for each depth, the error occurring at the depth sensor used in the sensor unit 15. The depth error database 71 outputs, to the degree-of-reliability calculation unit 72, an error $\sigma\alpha$ corresponding to a depth value indicated by the depth image data S.

The degree-of-reliability calculation unit 72 performs arithmetic processing of Formula (26) using the predicted error $\Delta$z when using the first motion vector $MV^1$ and the error $\sigma\alpha$, to calculate the degree of reliability DR$\alpha$ of the first motion vector $MV^1$, and outputs the degree of reliability DR$\alpha$ to the merge processing unit 75.

[Mathematical Formula 9]

$$DR\alpha = \exp\left(-\frac{\Delta z^2}{2\sigma_\alpha^2}\right) \quad (26)$$

The noise amount database 73 stores in advance a noise amount of noise generated by the image sensor used in the sensor unit 15 (e.g., at least one of shot noise, dark current, or noise and the like at a voltage conversion amplifier). The noise amount database 73 outputs a noise amount $\sigma\beta$ in the captured image data Isp to the degree-of-reliability calculation unit 74.

The degree-of-reliability calculation unit 74 performs arithmetic processing of Formula (27) using the captured image data Isp, the noise amount $\sigma\beta$, and a flatness FT (Isp), to calculate the degree of reliability DR$\beta$ of the second motion vector $MV^2$, and outputs the degree of reliability DR$\beta$ to the merge processing unit 75. Note that the flatness FT (Isp) indicates a standard deviation, a dynamic range, a variance, or the like of pixel data in the captured image data Isp.

[Mathematical Formula 10]

$$DR\beta = \exp\left(-\frac{E^2}{2\sigma_\beta^2}\right) \cdot FT(I_{sp}) \quad (27)$$

The motion vector merging unit 70 selects one of the first motion vector $MV^1$ and the second motion vector $MV^2$ on the basis of the degrees of reliability DR$\alpha$ and DR$\beta$ or merges the first motion vector $MV^1$ with the second motion vector $MV^2$ on the basis of the degrees of reliability DR$\alpha$ and DR$\beta$, to generate the motion vector MVt.

In a case where the merge processing unit 75 selects one of the first motion vector $MV^1$ and the second motion vector $MV^2$ to generate the motion vector MVt, when the degree of reliability DR$\alpha$ is larger than the degree of reliability DR$\beta$, the merge processing unit 75 sets the motion vector $MV^1$ for the motion vector MVt, and sets the degree of reliability DR$\alpha$ for the degree of reliability DRt of the motion vector MVt. Furthermore, when the degree of reliability DR$\alpha$ is not smaller than the degree of reliability DR$\beta$, the merge processing unit 75 sets the second motion vector $MV^2$ for the motion vector MVt, and sets the degree of reliability DRβ for the degree of reliability DRt of the motion vector MVt.

In a case where the merge processing unit 75 merges the first motion vector $MV^1$ with the second motion vector $MV^2$ to generate the motion vector MVt, the merge processing unit 75 generates the motion vector $MV^1$ by merging the first motion vector $MV^1$ with the second motion vector $MV^2$ in a ratio according to the degrees of reliability DRα and DRβ as represented by Formula (28). Furthermore, the merge processing unit 75 sets a result of addition of the degree of reliability DRα and the degree of reliability DRβ for the degree of reliability DRt of the motion vector MVt as represented by Formula (29).

[Mathematical Formula 11]

$$MV_t = \frac{DR\alpha \cdot MV^1 + DR\beta \cdot MV^2}{DR\alpha + DR\beta} \tag{28}$$

$$DR_t = DR\alpha + DR\beta \tag{29}$$

As described above, the merge processing unit 75 merges the first motion vector $MV^1$ with the second motion vector $MV^2$ to generate the motion vector MVt, and outputs the generated motion vector MVt and the degree of reliability DRt of the motion vector MVt to the image quality enhancement processing unit 80. Furthermore, the merge processing unit 75 causes the memory 76 to store the motion vector MVt. The motion vector stored in the memory 76 is used as described above by the first motion vector detection unit 50-1 and the second motion vector detection unit 60 in the subsequent processing, for example, processing in the next frame.

Figure 8:
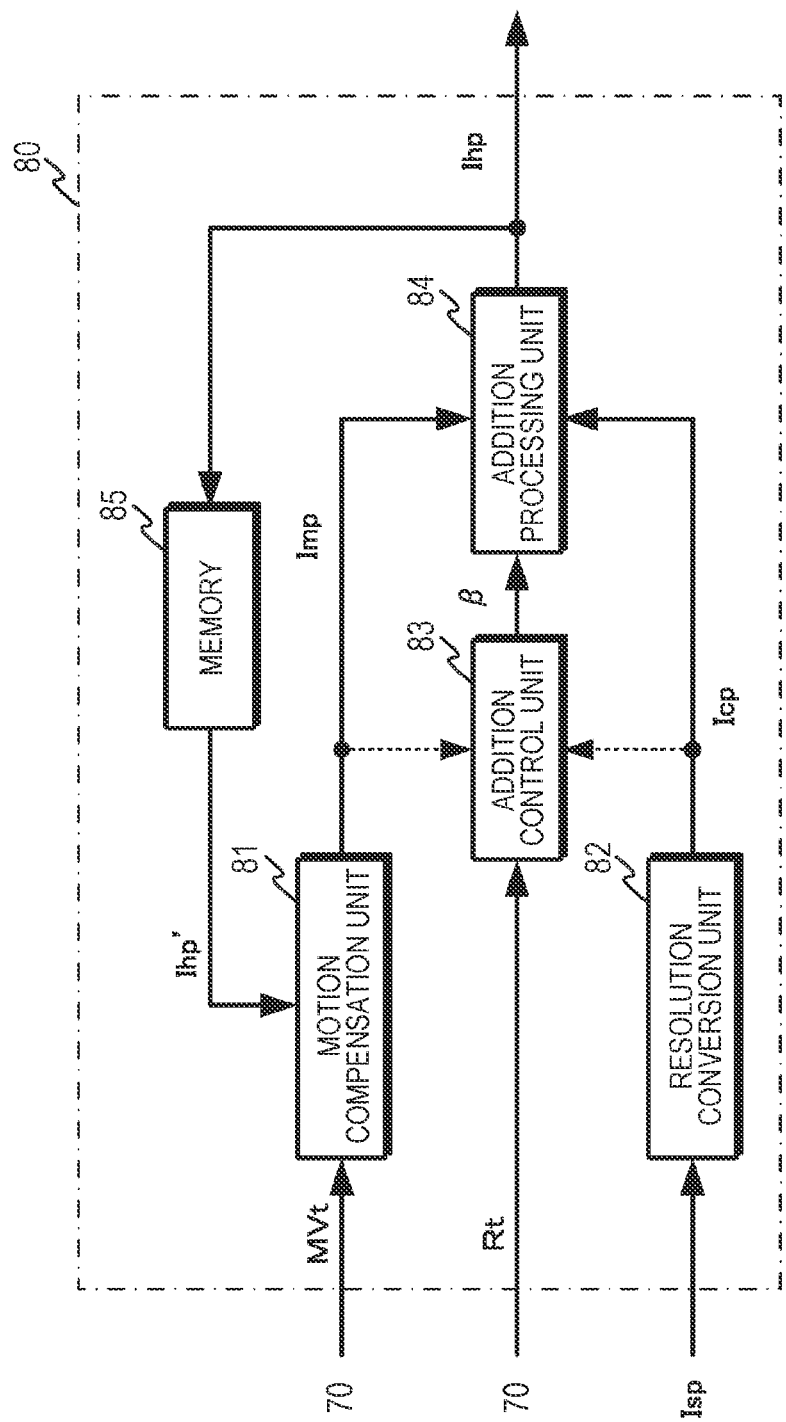
FIG. 8 is a diagram that exemplifies a configuration of an image quality enhancement processing unit.

FIG. 8 exemplifies a configuration of the image quality enhancement processing unit. The image quality enhancement processing unit 80 performs image quality enhancement processing on the captured image data Isp on the basis of the motion vector MVt and the degree of reliability DRt to generate the high-quality image data Ihp. The image quality enhancement processing unit 80 includes a motion compensation unit 81, a resolution conversion unit 82, an addition control unit 83, an addition processing unit 84, and a memory 85.

The motion compensation unit 81 performs motion compensation based on the motion vector MVt on a previous high-quality image (e.g., a high-quality captured image one frame before) Ihp' stored in the memory 85, to generate motion compensated image data Imp, and outputs the motion compensated image data Imp to the addition control unit 83 and the addition processing unit 84.

The resolution conversion unit 82 performs interpolation processing and the like on the captured image data Isp to generate resolution converted image data Icp that is larger in number of pixels than the captured image data Isp, and outputs the resolution converted image data Icp to the addition control unit 83 and the addition processing unit 84.

The addition control unit 83 calculates a mixing ratio β between the motion compensated image data Imp and the resolution converted image data Icp on the basis of the degree of reliability DRt. Formula (30) exemplifies a calculation formula for the mixing ratio β, and adjustment parameters ρ1 and ρ2 are set in advance. The addition control unit 83 outputs the calculated mixing ratio β to the addition processing unit 84. Note that the addition control unit 83 calculates the mixing ratio β on the basis of the degree of reliability DRt. Alternatively, the addition control unit 83 may calculate the mixing ratio β using a feature value indicating a noise amount, a blurring amount, a folding amount, or the like of the motion compensated image data Imp and the resolution converted image data Icp.

[Mathematical Formula 12]

$$\beta = \exp\left\{-\frac{\rho_1(1-DR_t)^2}{-2\rho_2\sigma_s^2}\right\} \tag{30}$$

The addition processing unit 84 adds the motion compensated image data Imp to the resolution converted image data Icp at the mixing ratio β calculated by the addition control unit 83, to generate the high-quality image data Ihp with less noise and high definition. The addition processing unit 84 performs, for example, arithmetic processing represented by Formula (31) to generate the high-quality image data Ihp, and the high-quality image data Ihp is output from the image processing unit 20-1. Furthermore, the addition processing unit 84 outputs the generated high-quality image data Ihp to the memory 85, and causes the memory 85 to store the high-quality image data Ihp.

[Mathematical Formula 13]

$$I_{hp} = \beta \cdot I_{mp} + (1-\beta) \cdot I_{cp} \tag{31}$$

Figure 9:
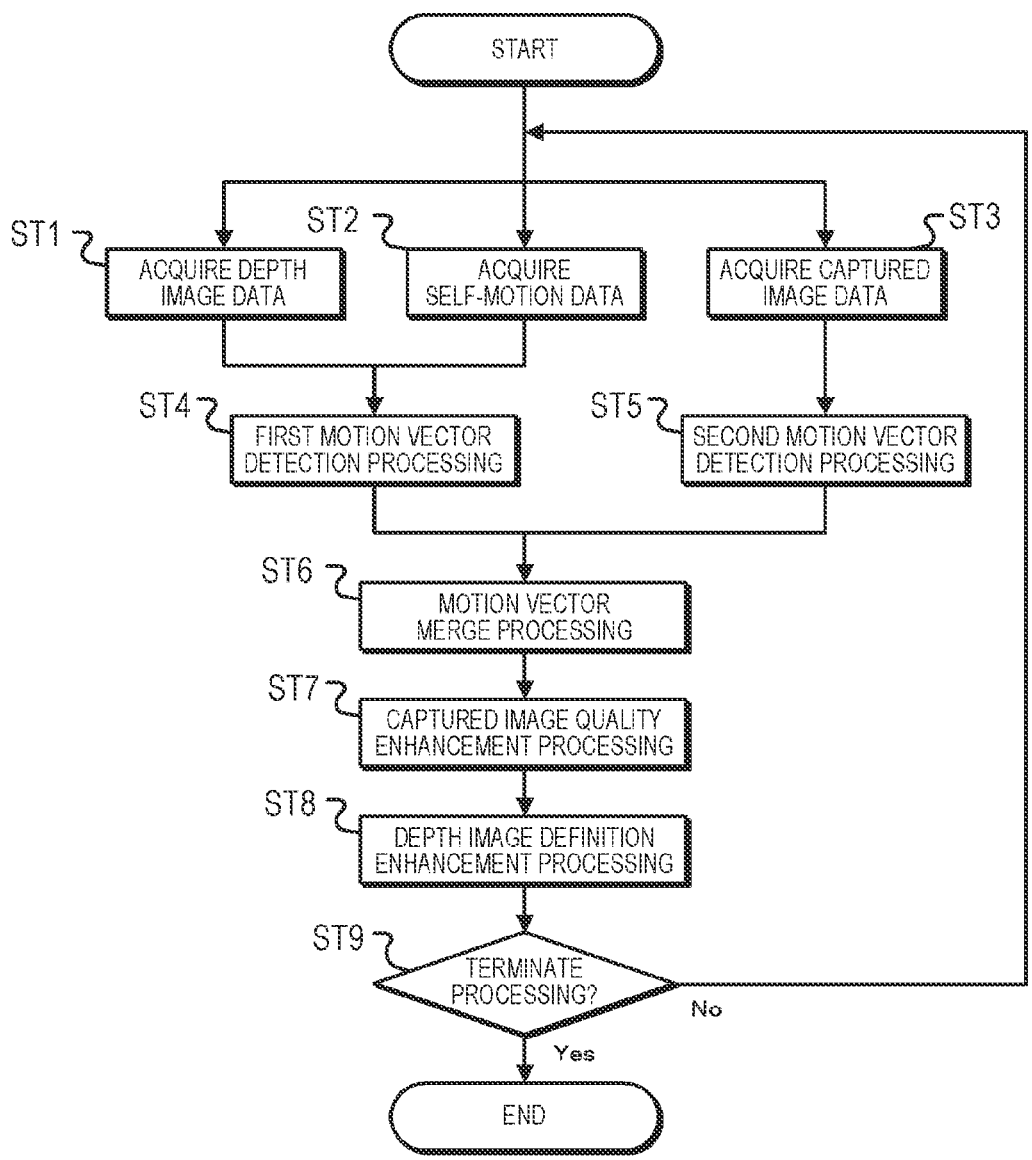
FIG. 9 is a flowchart that illustrates an operation of an image processing unit 20-1.

FIG. 9 is a flowchart that illustrates an operation of the image processing unit 20-1. In step ST1, the image processing unit acquires depth image data. The image processing unit 20-1 acquires depth image data Id generated by the sensor unit 15, and then proceeds to step ST4.

In step ST2, the image processing unit acquires self-motion data. The image processing unit 20-1 acquires self-motion data Dm generated by the sensor unit 15, and then proceeds to step ST4.

In step ST3, the image processing unit acquires captured image data. The image processing unit 20-1 acquires captured image data Isp generated by the sensor unit 15, and then proceeds to step ST4.

In step ST4, the image processing unit performs first motion vector detection processing. The first motion vector detection unit 50-1 of the image processing unit 20-1 detects a first motion vector $MV^1$ and a predicted error Δz on the basis of the depth image data, the self-motion data, and a previous motion vector. The image processing unit 20-1 then proceeds to step ST6.

In step ST5, the image processing unit performs second motion vector detection processing. The second motion vector detection unit 60 of the image processing unit 20-1 detects a second motion vector $MV^2$ and a predicted error E on the basis of the captured image data and the previous motion vector. The image processing unit 20-1 then proceeds to step ST6.

In step ST6, the image processing unit performs motion vector merge processing. The motion vector merging unit 70 of the image processing unit 20-1 merges the first motion vector $MV^1$ with the second motion vector $MV^2$ on the basis of the predicted error Δz detected in step ST4 and the predicted error E detected in step ST5, to generate a motion vector MVt. Furthermore, the motion vector merging unit 70 generates a degree of reliability DRt of the motion vector MVt. The image processing unit 20-1 then proceeds to step ST7.

In step ST7, the image processing unit performs image quality enhancement processing. The image quality enhancement processing unit 80 of the image processing unit 20-1 performs motion compensation on a previously generated high-quality image, using the motion vector MVt generated in step ST6, and adds the high-quality image subjected to the motion compensation to the high-definition captured image generated by the sensor unit 15, at an adding ratio according to the degree of reliability DRt of the motion vector MVt, to generate a high-quality image that is higher in image quality than the captured image generated by the sensor unit 15. The image processing unit 20-1 then proceeds to step ST8.

In step ST8, the image processing unit performs depth image data definition enhancement processing. The depth processing unit 30 of the image processing unit 20-1 performs definition enhancement processing, for example, guided filter processing on the depth image data generated by the sensor unit 15 using the previously generated high-quality image, to generate depth image data that is higher in definition than the depth image data generated by the sensor unit 15. The image processing unit 20-1 then proceeds to step ST9.

In step ST9, the image processing unit determines whether to terminate the processing. The image processing unit 20-1 returns to step ST1 in a case where the sensing data is continuously acquired and an instruction to terminate the high-quality image generating operation is not provided, and terminates the operation in a case where the acquisition of the sensing data is completed or in a case where the instruction to terminate the high-quality image generating operation is provided.

Note that FIG. 9 exemplifies the case where steps ST1 to ST3 are carried out in parallel and steps ST4 and ST5 are carried out in parallel; however, the sequence of the respective steps is not limited to that illustrated in FIG. 9. For example, steps ST1 to ST5 may be carried out in this order. Furthermore, steps ST1 and ST2 are only required to be carried out prior to step ST4, and step ST4 may be carried out prior to step ST5, and vice versa as long as steps ST4 and ST5 are carried out prior to step ST6.

As described above, according to the first embodiment, a motion vector can be accurately detected using multiple kinds of sensing data. For example, a motion vector can be accurately detected even in a flat region, a dark region, or the like in a captured image for which it is difficult to accurately detect a motion vector by a conventional method. Furthermore, since a motion vector can be accurately detected, for example, the performance of image quality enhancement processing (e.g., noise removal processing, super-resolution processing, etc.) to be performed on a captured image can be improved. Furthermore, since self-motion data is contained in sensing data, and a motion vector can be accurately detected even in a camera panning operation or a camera zooming operation, the image quality enhancement processing can be performed using the detected motion vector without a feeling of afterimage. Moreover, the resolution of depth image data can be improved by performing the definition enhancement processing on depth image data using a captured image obtained by performing super-definition processing as the image quality enhancement processing. Furthermore, the accuracy of a motion vector can also be improved using high-definition depth image data.

2. Second Embodiment

<2-1. Configuration of Image Processing Apparatus>

Figure 10:
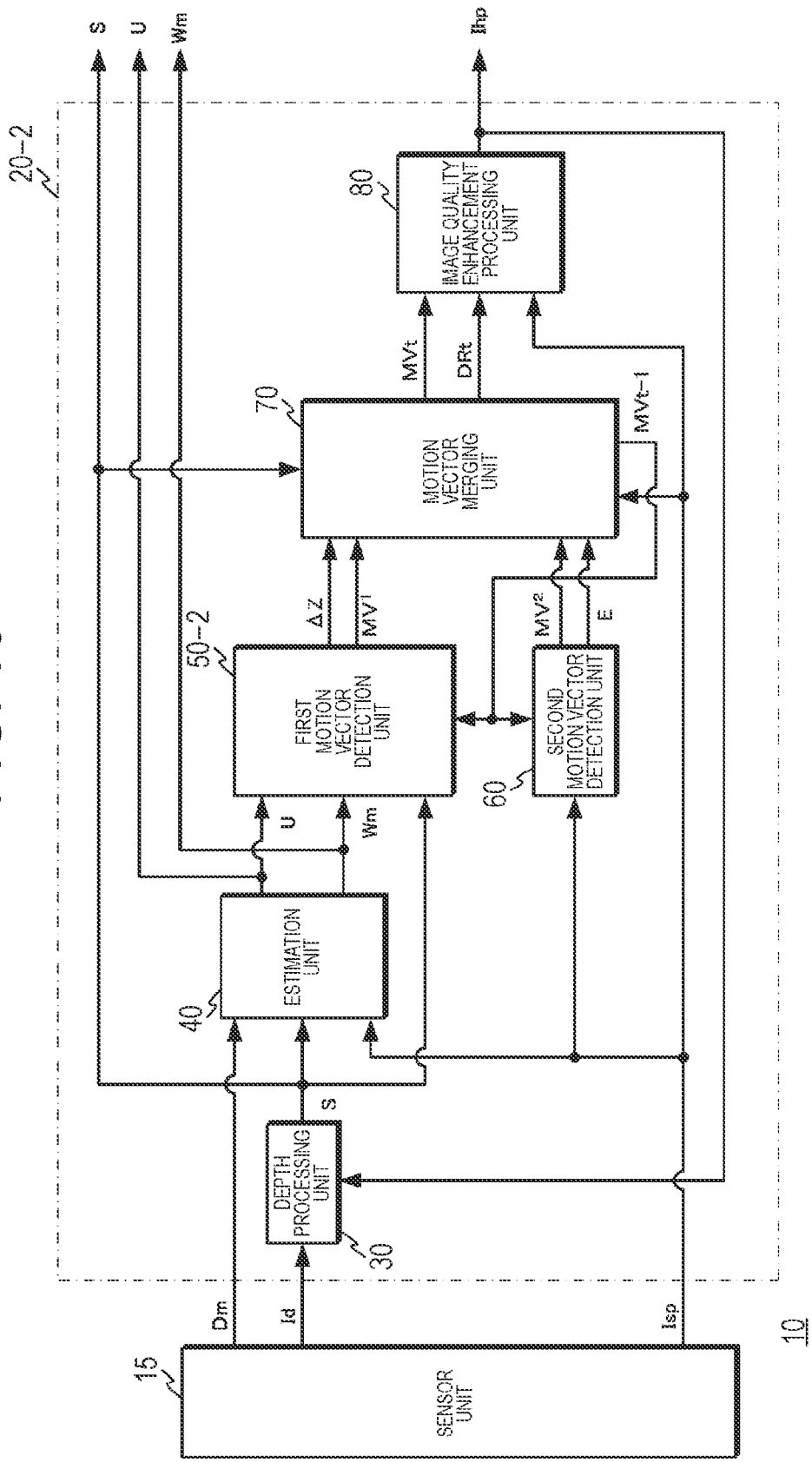
FIG. 10 is a diagram that exemplifies another configuration of an information processing system.

FIG. 10 exemplifies another configuration of an information processing system. An information processing system 10 includes a sensor unit 15 and an image processing unit 20-2. The image processing unit 20-2 according to the second embodiment detects a motion vector, using a technology of simultaneous localization and mapping (SLAM) capable of preparing an environment map and estimating a self position in the prepared environment map.

The sensor unit 15 includes an image sensor, a depth sensor, and a motion sensor such as an inertial measurement unit (IMU). The image sensor generates captured image data Isp. The depth sensor generates depth image data Id indicating a distance to a subject contained in a captured image. In addition, the motion sensor generates self-motion data Dm indicating a motion of the sensor unit 15.

The image processing unit 20-2 is configured using a motion vector detection apparatus according to the present technology. The image processing unit 20-2 includes a depth processing unit 30, an estimation unit 40, a first motion vector detection unit 50-2, a second motion vector detection unit 60, a motion vector merging unit 70, and an image quality enhancement processing unit 80.

The depth processing unit 30 performs definition enhancement processing on the depth image data Id supplied from the depth sensor of the sensor unit 15, to generate depth image data S that is higher in definition than the depth image data Id. The depth processing unit 30 performs the definition enhancement processing using high-quality image data Ihp obtained by performing image quality enhancement processing on the captured image data Isp using a motion vector merged by the motion vector merging unit 70. The depth processing unit 30 outputs, to the estimation unit 40 and the first motion vector detection unit 50-2, the depth image data S obtained by performing the definition enhancement processing.

The estimation unit 40 generates environment map Wm indicating a result of estimation on a three-dimensional peripheral environment and self-position data U indicating a result of estimation on a self position, using the SLAM technology, on the basis of the captured image data Isp supplied from the sensor unit 15, the self-motion data Dm, and the depth image data S supplied from the depth processing unit 30. The estimation unit 40 outputs the generated environment map Wm and self-position data U to the first motion vector detection unit 50-2. For example, the world coordinates W of the position TP illustrated in FIG. 5 are depicted in this environment map Wm. Furthermore, the self-position data U makes the motion of the sensor unit 15 clear, so that a coordinate transformation matrix V can be calculated from the self-position data U.

The first motion vector detection unit 50-2 receives the depth image data S from the depth processing unit 30, receives the self-position data U and the environment map Wm from the estimation unit 40, and receives a previous motion vector, for example, a motion vector MVt−1 in a preceding frame from the motion vector merging unit 70. The first motion vector detection unit 50-2 detects a motion vector $MV^1$ on the basis of the self-position data U, the environment map Wm, the depth image data S, and the motion vector MVt−1, calculates a predicted error Δz when using the motion vector $MV^1$, and outputs the predicted error Δz to the motion vector merging unit 70.

The second motion vector detection unit 60 receives the captured image data Isp from the sensor unit 15, and receives the previous motion vector, for example, the motion vector MVt−1 in the preceding frame from the motion vector merging unit 70. The second motion vector detection unit 50-1 detects a motion vector $MV^2$ on the basis of the captured image data Isp and the motion vector MVt−1, and calculates a predicted error E when using the motion vector $MV^2$. The first motion vector detection unit 50-2 outputs the detected motion vector $MV^2$ and the calculated predicted error E to the motion vector merging unit 70.

The motion vector merging unit 70 merges the motion vector detected by the second motion vector detection unit 50-2 with the motion vector detected by the second motion vector detection unit 60. The motion vector merging unit 70 receives the captured image data Isp from the image sensor, receives the depth image data S from the depth processing unit 30, receives the motion vector $MV^1$ and the predicted error Δz from the first motion vector detection unit 50-1, and receives the motion vector $MV^2$ and the predicted error E from the second motion vector detection unit 50-1. The motion vector merging unit 70 calculates a degree of reliability DRα on the basis of the depth image data S and the predicted error Δz, and calculates a degree of reliability DRβ on the basis of the captured image data Isp and the predicted error E. The motion vector merging unit 70 merges the motion vector $MV^1$ with the motion vector $MV^2$ on the basis of the degrees of reliability DRα and DRβ to generate a motion vector MVt. Furthermore, the motion vector merging unit 70 calculates a degree of reliability DRt of the motion vector MVt, and outputs the motion vector MVt and the degree of reliability DRt to the image quality enhancement processing unit 80.

The image quality enhancement processing unit 80 receives the captured image data Isp from the image sensor, and receives the motion vector MVt and the degree of reliability DRt from the motion vector merging unit 70. The image quality enhancement processing unit 80 generates high-quality image data Ihp that is higher in image quality than the captured image data Isp, on the basis of the motion vector MVt, the degree of reliability DRt, and the captured image data Isp. Note that the image quality enhancement processing unit 80 outputs the generated high-quality image data Ihp to the outside and, in addition, supplies the generated high-quality image data Ihp to the depth processing unit 30 as described above.

<2-2. Configurations and Operations of Respective Units>

Next, a description will be given of configurations and operations of the respective units. The depth processing unit 30 has a configuration similar to that in the first embodiment. The depth processing unit 30 generates the depth image data S that is higher in definition than the depth image data Id, on the basis of the depth image data Id generated by the sensor unit 15 and the high-quality image data Ihp generated by the image quality enhancement processing unit 80.

Figure 11:
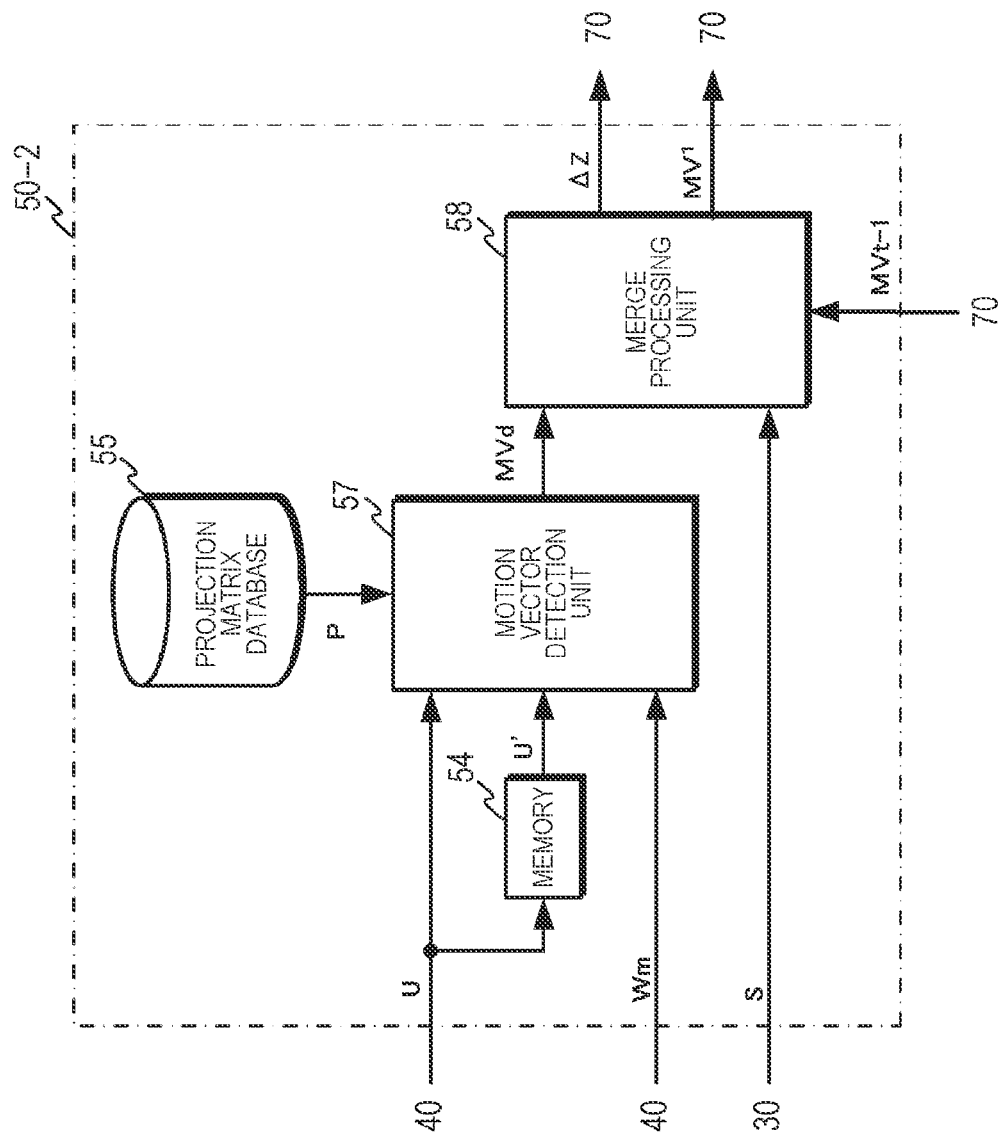
FIG. 11 is a diagram that exemplifies a configuration of a first motion vector detection unit.

FIG. 11 exemplifies a configuration of the first motion vector detection unit. The first motion vector detection unit 50-2 includes a memory 54, a projection matrix database 55, a motion vector detection unit 57, and a merge processing unit 58.

The memory 54 stores the self-position data U output from the estimation unit 40, and outputs stored self-position data U' to the motion vector detection unit 57.

The projection matrix database 55 stores the projection matrix P in a manner similar to that in the first embodiment, and outputs the stored projection matrix P to the motion vector detection unit 57.

The motion vector detection unit 57 calculates a candidate motion vector MVd on the basis of the self-position data U from the estimation unit 40, previous self-position data stored in the memory 52, for example, the self-position data U' one frame before, the environment map Wm supplied from the estimation unit 40, the projection matrix P, and the depth image data S supplied from the depth processing unit. Here, the self-position data U corresponds to the position represented by the coordinate transformation matrix V in the first embodiment, and the self-position data U' corresponds to the position represented by the coordinate transformation matrix V' in the first embodiment. Furthermore, the environment map Wm shows a position using world coordinates, and a position of an object depicted in the environment map Wm corresponds to the world coordinates W. Therefore, the candidate motion vector MVdt can be calculated on the basis of Formula (32), on the basis of Formulas (14) and (15) described above. Therefore, the motion vector detection unit 56 performs arithmetic processing of Formula (32) to calculate the candidate motion vector MVdt, and outputs the candidate motion vector MVdt to the merge processing unit 58.

[Mathematical Formula 14]

$$MV_{dt}=S_{TP}-S_{TP}'=PUW-PU'W=P(U-U')W \tag{32}$$

The merge processing unit 58 generates the first motion vector $MV^1$ on the basis of the candidate motion vector MVdt calculated by the motion vector detection unit 57 and the previous motion vector MVt−1 supplied from the motion vector merging unit 70. In a manner similar to that in the first embodiment, the merge processing unit 58 selects one of the candidate motion vector MVdt and the motion vector MVt−1 or merges the candidate motion vector MVdt with the motion vector MVt−1 to generate the first motion vector $MV^1$ on the basis of a predicted error Δzt when using the candidate motion vector MVdt and a predicted error Δzt−1 when using the motion vector MVt−1. Furthermore, the merge processing unit 58 calculates the predicted error Δz when using the first motion vector $MV^1$. The merge processing unit 58 sets the first motion vector $MV^1$ for the motion vector detected by the first motion vector detection unit 50-2, and outputs the first motion vector $MV^1$ together with the predicted error Δz to the motion vector merging unit 70.

The second motion vector detection unit 60 has a configuration similar to that in the first embodiment. The second motion vector detection unit 60 performs block matching using the captured image data Isp and, for example, captured image data Isp' one frame before to calculate the second motion vector $MV^2$ and the predicted error E. The second motion vector detection unit 60 outputs the calculated second motion vector $MV^2$ and predicted error E to the motion vector merging unit 70.

The motion vector merging unit 70 has a configuration similar to that in the first embodiment. The motion vector merging unit 70 calculates a degree of reliability DRα of the first motion vector $MV^1$, using the predicted error Δz when using the first motion vector $MV^1$ and an error mix for each depth, the error σα occurring at the depth sensor. Furthermore, the motion vector merging unit 70 calculates a degree of reliability DRβ of the second motion vector $MV^2$, using the captured image data Isp, a noise amount σβ generated in the image sensor, and a flatness FT (Isp). Moreover, the merge processing unit 75 of the motion vector merging unit 70 selects one of the first motion vector $MV^1$ and the second motion vector $MV^2$ on the basis of the degrees of reliability DRα and DRβ or merges the first motion vector $MV^1$ with the second motion vector $MV^2$ on the basis of the degrees of reliability DRα and DRβ, to generate the motion vector MVt.

The merge processing unit 75 outputs the generated motion vector MVt and the degree of reliability DRt of the motion vector MVt to the image quality enhancement processing unit 80. Furthermore, the merge processing unit 75 causes the memory 76 to store the motion vector MVt. The motion vector stored in the memory 76 is used as described above by the first motion vector detection unit 50-2 and the second motion vector detection unit 60 in the subsequent processing, for example, processing in the next frame.

The image quality enhancement processing unit 80 has a configuration similar to that in the first embodiment. The image quality enhancement processing unit 80 performs image quality enhancement processing on the captured image data Isp on the basis of the motion vector MVt and the degree of reliability DRt to generate the high-quality image data Ihp. The image quality enhancement processing unit 80 performs motion compensation based on the motion vector MVt on, for example, high-quality image data Ihp' one frame before to generate the motion compensated image data Imp. Furthermore, the image quality enhancement processing unit 80 generates resolution converted image data Icp that is larger in number of pixels than the captured image data Isp. Moreover, the image quality enhancement processing unit 80 calculates a mixing ratio β between the motion compensated image data Imp and the resolution converted image data Icp on the basis of the degree of reliability DRt, and adds the motion compensated image data Imp to the resolution converted image data Icp at the calculated mixing ratio β to generate the high-quality image data Ihp.

Figure 12:
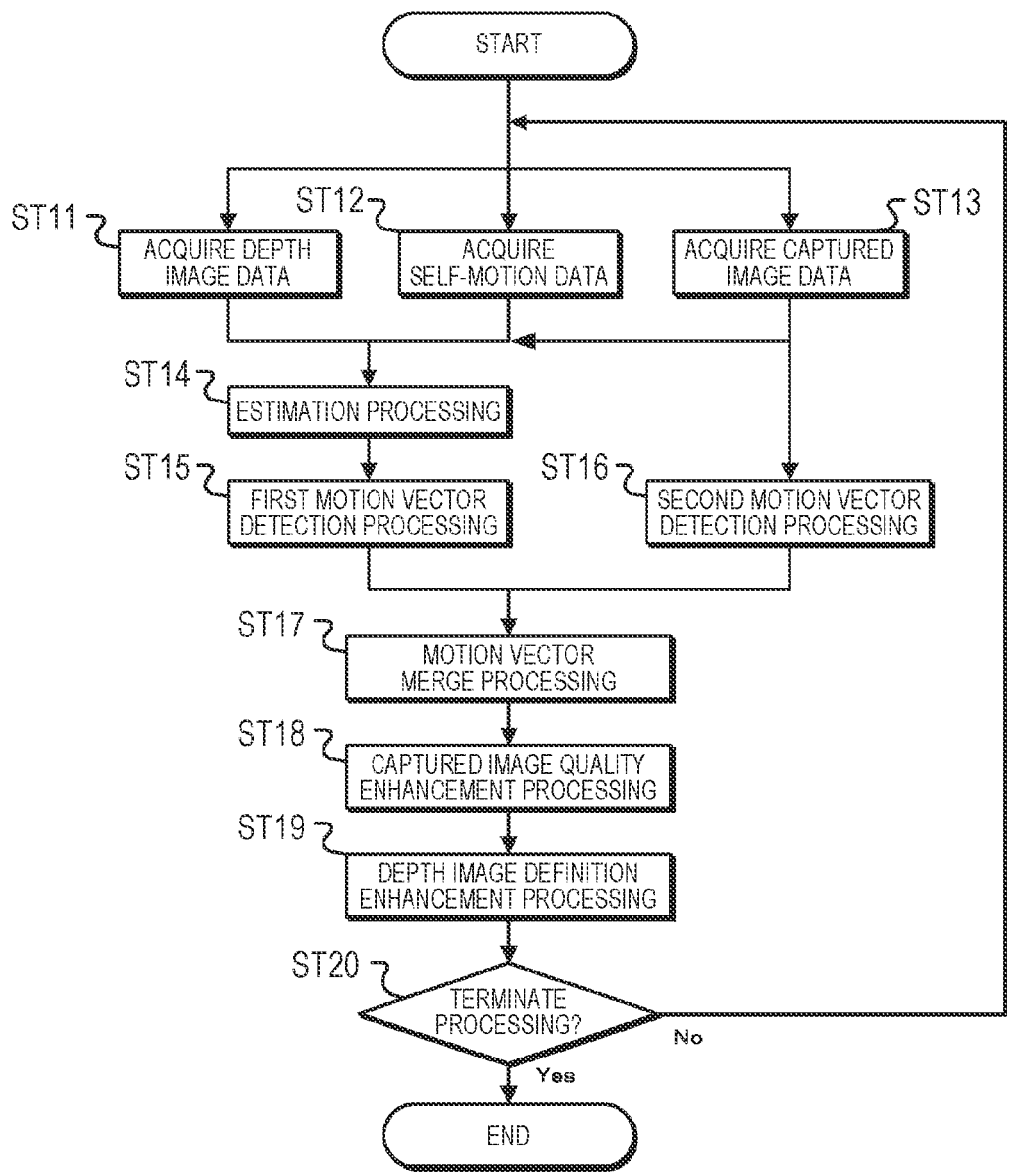
FIG. 12 is a flowchart that illustrates an operation of an image processing unit 20-2.

FIG. 12 is a flowchart that illustrates an operation of the image processing unit 20-2. In step ST11, the image processing unit acquires depth image data. The image processing unit 20-2 acquires depth image data Id generated by the sensor unit 15, and then proceeds to step ST14.

In step ST12, the image processing unit acquires self-motion data. The image processing unit 20-2 acquires self-motion data Dm generated by the sensor unit 15, and then proceeds to step ST14.

In step ST13, the image processing unit acquires captured image data. The image processing unit 20-2 acquires captured image data Isp generated by the sensor unit 15, and then proceeds to step ST16.

In step ST14, the image processing unit performs estimation processing. The estimation unit 40 of the image processing unit 20-2 performs, for example, SLAM processing using the depth image data Id and the self-motion data Dm to generate an environment map and self-position data. The image processing unit 20-2 then proceeds to step ST15.

In step ST15, the image processing unit performs first motion vector detection processing. The first motion vector detection unit 50-2 of the image processing unit 20-2 detects a first motion vector $MV^1$ and a predicted error Δz on the basis of the environment map Wm and the self-position data U. The image processing unit 20-2 then proceeds to step ST17.

In step ST16, the image processing unit performs second motion vector detection processing. The second motion vector detection unit 60 of the image processing unit 20-2 detects a second motion vector $MV^2$ and a predicted error E on the basis of the captured image data and the previous motion vector. The image processing unit 20-2 then proceeds to step ST17.

In step ST6, the image processing unit performs motion vector merge processing. The motion vector merging unit 70 of the image processing unit 20-2 merges the first motion vector $MV^1$ with the second motion vector $MV^2$ on the basis of the predicted error Δz detected in step ST15 and the predicted error E detected in step ST16, to generate a motion vector MVt. Furthermore, the motion vector merging unit 70 calculates a degree of reliability DRt of the motion vector MVt. The image processing unit 20-2 then proceeds to step ST18.

In step ST18, the image processing unit performs image quality enhancement processing. The image quality enhancement processing unit 80 of the image processing unit 20-2 performs motion compensation on a high-quality image previously generated using the motion vector MVt generated in step ST17. Furthermore, the image quality enhancement processing unit 80 adds the high-quality image subjected to the motion compensation to the high-definition captured image generated by the sensor unit 15, at an adding ratio according to the degree of reliability DRt of the motion vector MVt, to generate a high-quality image that is higher in image quality than the captured image generated by the sensor unit 15. The image processing unit 20-2 then proceeds to step ST19.

In step ST19, the image processing unit performs depth image data definition enhancement processing. The depth processing unit 30 of the image processing unit 20-2 performs definition enhancement processing, for example, guided filter processing on the depth image data generated by the sensor unit 15 using the previously generated high-quality image, to generate depth image data that is higher in definition than the depth image data generated by the sensor unit 15. The image processing unit 20-2 then proceeds to step ST20.

In step ST20, the image processing unit determines whether to terminate the processing. The image processing unit 20-1 returns to step ST11 in a case where the sensing data is continuously acquired and an instruction to terminate the high-quality image generating operation is not provided, and terminates the operation in a case where the acquisition of the sensing data is completed or in a case where the instruction to terminate the high-quality image generating operation is provided.

Note that FIG. 12 exemplifies the case where steps ST11 to ST13 are carried out in parallel and steps ST14 to ST16 are carried out in parallel; however, the sequence of the respective steps is not limited to that illustrated in FIG. 12. For example, steps ST11 to ST16 may be carried out in this order. Furthermore, steps ST11 and ST13 are only required to be carried out prior to step ST14, and step ST15 may be carried out prior to step ST16, and vice versa as long as steps ST15 and ST16 are carried out prior to step ST17.

As described above, according to the second embodiment, as in the first embodiment, a motion vector can be accurately detected using multiple kinds of sensing data. Furthermore, since a motion vector can be accurately detected, the performance of image quality enhancement processing to be performed on a captured image can be improved. Furthermore, since self-motion data is contained in sensing data, and a motion vector can be accurately detected even in a camera panning operation or a camera zooming operation, the image quality enhancement processing can be performed using the detected motion vector without a feeling of afterimage. Furthermore, the resolution of depth image data can be improved by performing the processing of merging the depth image data with the high-definition captured image obtained by performing the super-definition processing as the image quality enhancement processing. Moreover, an environment map can be accurately generated and a self position can be accurately estimated using high-resolution depth image data.

3. Other Embodiments

Meanwhile, the foregoing embodiments exemplify the case where the depth processing unit 30 and the resolution conversion unit 82 are provided to generate high-definition depth image data. In a case where the image quality enhancement processing unit 80 does not include the resolution conversion unit 82, the first motion vector detection units 50-1 and 50-2 may detect a first motion vector using depth image data Id generated by the sensor unit 15. In this case, there is a possibility that the resolution of a motion vector is lower than those in the first embodiment and the second embodiment. However, a motion vector can be accurately detected as compared with a case where a motion vector is detected from a captured image.

Furthermore, the foregoing embodiments exemplify the case where the estimation unit 40 performs the SLAM processing using the captured image data Isp generated by the sensor unit 15. Alternatively, an environment map can be accurately generated and a self position can be accurately estimated as compared with the foregoing second embodiment in such a manner that the estimation unit 40 performs the SLAM processing using the high-quality image data Ihp generated by the image quality enhancement processing unit 80.

Note that the effects described in the present specification are merely exemplary and not limitative, and there may be achieved additional effects.

4. Application Examples

The technology according to the present disclosure is applicable to various products. For example, high-quality surveillance image data and the like can be obtained in such a manner that the technology according to the present disclosure is applied to a surveillance camera, a live camera, or the like that is provided at a fixed position. Furthermore, a motion vector of a subject can be accurately detected. Moreover, since the estimation unit 40 enables generation of an environment map and estimation of a self position in the second embodiment, the technology according to the present disclosure may be applied to, for example, an apparatus or the like to be installed in any kind of moving objects such as an automobile, an electric vehicle, a hybrid electric vehicle, a motorcycle, a bicycle, a personal mobility, an airplane, a drone, a ship, a robot, a construction machine, an agricultural machine (a tractor), and a mobile terminal (a smartphone).

A series of the processing tasks described in the specification can be executed by hardware, software, or a composite configuration of hardware and software. In a case where the series of processing tasks is executed by software, a computer incorporated in dedicated hardware executes a program recording therein a processing sequence in such a manner that the program is installed in a memory in the computer. Alternatively, the program may be installed in and executed by a general computer capable of executing various kinds of processing tasks.

For example, the program can be recorded in advance on a recording medium such as a hard disk, a solid state drive (SSD), or a read only memory (ROM). Alternatively, the program can be temporarily or permanently stored in (recorded on) a removable recording medium such as a flexible disk, a compact disc read only memory (CD-ROM), a magneto optical (MO) disc, a digital versatile disc (DVD), a Blu-Ray disc (BD) (registered trademark), a magnetic disc, or a semiconductor memory card. Such a removable recording medium can also be provided in the form of packaged software.

Furthermore, the program may be installed in a computer from a removable recording medium. In addition, the program may be transferred from a download site to a computer in a wireless or wired manner via a network such as a local area network (LAN) or the Internet. The computer can receive the program transferred in such a way described above, and install the received program in a recording medium such as a hard disk incorporated therein.

Note that the effects described in the present specification are merely exemplary and not limitative, and there may be achieved additional effects not described in the present specification. Furthermore, the present technology should not be construed as being limited to the embodiments of the foregoing technology. An embodiment of this technology discloses the present technology in the form of exemplification. It is obvious that a person skilled in the art can conceive any modification and substitution on an embodiment within a range not departing from the scope of the present technology. That is, the claims should be taken into consideration in order to make a determination as to the scope of the present technology.

Furthermore, a motion vector detection apparatus according to the present technology may adopt the following configurations.

(1) A motion vector detection apparatus including:
a first motion vector detection unit configured to detect a motion vector on the basis of self-motion data of a sensor unit and depth image data generated by the sensor unit;
a second motion vector detection unit configured to detect a motion vector on the basis of captured image data generated by the sensor unit; and
a motion vector merging unit configured to merge the motion vector detected by the first motion vector detection unit with the motion vector detected by the second motion vector detection unit.

(2) The motion vector detection apparatus as recited in (1), in which the first motion vector detection unit detects the motion vector by merging a candidate motion vector calculated using a projection matrix calculated in advance on the basis of an angle of view and an aspect ratio upon generation of the depth image data and captured image data, with a previously detected motion vector.

(3) The motion vector detection apparatus as recited in (2), in which the first motion vector detection unit merges the candidate motion vector with the previously detected motion vector on the basis of a predicted error when using the candidate motion vector and a predicted error when using the previously detected motion vector.

(4) The motion vector detection apparatus as recited in (2) or (3), in which the first motion vector detection unit calculates the candidate motion vector using the depth image data and a coordinate transformation matrix representing a motion indicated by the self-motion data.

(5) The motion vector detection apparatus as recited in (2) or (3), further including:
an estimation unit configured to generate an environment map and estimate a self position on the basis of the self-motion data, in which the first motion vector detection unit calculates the candidate motion vector using the environment map generated by the estimation unit and an estimation result of the self position.

(6) The motion vector detection apparatus as recited in any of (2) to (5), in which the first motion vector detection unit and the second motion vector detection unit each calculate a predicted error when using the detected motion vector, and the motion vector merging unit calculates a degree of reliability of the motion vector detected by the first motion vector detection unit, using the predicted error calculated by the first motion vector detection unit, calculates a degree of reliability of the motion vector detected by the second motion vector detection unit, using the predicted error calculated by the second motion vector detection unit, and merges the motion vector detected by the first motion vector detection unit with the motion vector detected by the second motion vector detection unit, on the basis of the calculated degrees of reliability.

(7) The motion vector detection apparatus as recited in (6), in which the motion vector merging unit calculates the degree of reliability of the motion vector detected by the first motion vector detection unit, on the basis of the predicted error calculated by the first motion vector detection unit and an error of the depth image data, and calculates the degree of reliability of the motion vector detected by the second motion vector detection unit, on the basis of the predicted error calculated by the second motion vector detection unit and a noise amount of the captured image data.

(8) The motion vector detection apparatus as recited in any of (1) to (7), further including:

a depth processing unit configured to perform definition enhancement processing on the depth image data generated by the sensor unit, to generate high-definition depth image data, in which the first motion vector detection unit uses the high-definition depth image data generated by the depth processing unit, in place of the depth image data.

(9) The motion vector detection apparatus as recited in (8), in which the depth processing unit performs the definition enhancement processing using high-quality captured image data obtained by performing image quality enhancement processing on the captured image data using the motion vector merged by the motion vector merging unit.

REFERENCE SIGNS LIST

10 Information processing system
15 Sensor unit
20-1, 20-2 Image processing unit
30 Depth processing unit
31 Guided filter
40 Estimation unit
50-1, 50-2 First motion vector detection unit
51 Transformation matrix calculation unit
52, 53, 54, 61, 76, 85 Memory
55 Projection matrix database
56, 57 Motion vector detection unit
58, 75 Merge processing unit
60 Second motion vector detection unit
62 Block matching unit
70 Motion vector merging unit
71 Depth error database
72, 74 Degree-of-reliability calculation unit
73 Noise amount database
80 Image quality enhancement processing unit
81 Motion compensation unit
82 Resolution conversion unit
83 Addition control unit
84 Addition processing unit

The invention claimed is:

1. A motion vector detection apparatus, comprising:
a motion sensor configured to acquire self-motion data, depth image data, and captured image data; and
circuitry configured to:
    detect a first motion vector based on the self-motion data and the depth image data;
    detect a second motion vector based on the captured image data;
    calculate a first predicted error of the first motion vector and a second predicted error of the second motion vector;
    calculate a first degree of reliability and a second degree of reliability based on the first predicted error and the second predicted error, respectively; and
    merge the first motion vector with the second motion vector based on the first degree of reliability and the second degree of reliability.

2. The motion vector detection apparatus according to claim 1, wherein the circuitry is further configured to:
    detect the first motion vector by calculation of a candidate motion vector using a projection matrix corresponding to an angle of view and an aspect ratio each corresponding to the depth image data and the captured image data, and
    merge the candidate motion vector with a previously detected motion vector.

3. A motion vector detection method, comprising:
    acquiring, by a motion sensor, self-motion data, depth image data, and captured image data;
    detecting, by a circuitry, a first motion vector based on the self-motion data and the depth image data;
    detecting, by the circuitry, a second motion vector based on the captured image data;
    calculating, by the circuitry, a first predicted error of the first motion vector and a second predicted error of the second motion vector;
    calculating, by the circuitry, a first degree of reliability and a second degree of reliability based on the first predicted error and the second predicted error, respectively; and
    merging, by the circuitry, the first motion vector with the second motion vector based on the first degree of reliability and the second degree of reliability.

* * * * *